(12) United States Patent
Oyama et al.

(10) Patent No.: US 9,279,614 B2
(45) Date of Patent: Mar. 8, 2016

(54) DRYING/CARBONIZING DEVICE AND METHOD THEREOF

(75) Inventors: Toshio Oyama, Kanagawa (JP); Masami Hoshi, Kanagawa (JP)

(73) Assignee: MUTSUWA KOGYO KABUSHIKI KAISHA, Kawasaki-shi (JP)

( * ) Notice: Subject to any disclaimer, the term of this patent is extended or adjusted under 35 U.S.C. 154(b) by 415 days.

(21) Appl. No.: 13/821,874

(22) PCT Filed: Sep. 7, 2011

(86) PCT No.: PCT/JP2011/005025
§ 371 (c)(1),
(2), (4) Date: Mar. 8, 2013

(87) PCT Pub. No.: WO2012/053147
PCT Pub. Date: Apr. 26, 2012

(65) Prior Publication Data
US 2013/0160320 A1    Jun. 27, 2013

(30) Foreign Application Priority Data
Oct. 20, 2010   (JP) ................. 2010-235127

(51) Int. Cl.
*F26B 17/20*    (2006.01)
*F26B 3/04*    (2006.01)
(Continued)

(52) U.S. Cl.
CPC . *F26B 3/04* (2013.01); *C02F 11/12* (2013.01); *C02F 11/125* (2013.01); *C10B 47/44* (2013.01);
(Continued)

(58) Field of Classification Search
CPC ........ F26B 17/20; F26B 17/205; F26G 5/027; F26G 5/0273; F26G 5/0276; F26G 5/04; F23G 2201/10; F23G 2201/101; F23G 2201/30; F23G 2201/301; F23G 2201/302; F23G 2201/40; C02F 11/10; C02F 11/12; C10B 47/44; C10B 7/10
See application file for complete search history.

(56) References Cited

U.S. PATENT DOCUMENTS

| | | | | |
|---|---|---|---|---|
| 4,872,949 A | * | 10/1989 | Wilwerding | ............. B01D 3/10 159/26.1 |
| 5,321,900 A | * | 6/1994 | Meyer | .................. F26B 17/205 34/129 |
| 5,806,205 A | * | 9/1998 | Varvat | .................. F26B 23/022 34/179 |

FOREIGN PATENT DOCUMENTS

| | | |
|---|---|---|
| EP | 1 306 352 | 5/2003 |
| JP | 1 148792 | 10/1989 |

(Continued)

OTHER PUBLICATIONS

International Preliminary Report on Patentability issued May 10, 2013, in PCT/JP2011/005025, filed Sep. 7, 2011.

(Continued)

*Primary Examiner* — David J Laux
(74) *Attorney, Agent, or Firm* — Oblon, McClelland, Maier & Neustadt, L.L.P.

(57) ABSTRACT

This drying/carbonizing device is formed from providing within a drying chamber: a plurality of tubes, to one end of which an inlet is formed and to the other end of which an outlet is formed, of which the upper and lower ends are interconnected to each other to form a single chain, and which have rotatable screw conveyers therewithin that are disposed in a manner so that the outward paths and return paths vertically alternate; horizontal tubes that are attached at appropriate intervals along the lengthwise direction of the plurality of tubes and that are horizontal discharge tubes connected to the plurality of tubes; vertical tubes that are connected to the ends of the horizontal tubes and that are provided in the vertical direction; and a bottom collection tube that is provided horizontally to the bottom, links the ends of the vertical tubes, and removes gas.

17 Claims, 9 Drawing Sheets

(51) Int. Cl.
  *C02F 11/12* (2006.01)
  *C02F 11/10* (2006.01)
  *C10B 7/10* (2006.01)
  *C10B 49/04* (2006.01)
  *C10B 47/44* (2006.01)
  *C10B 53/00* (2006.01)
  *F26B 23/02* (2006.01)
  *C02F 103/20* (2006.01)
  *C02F 103/32* (2006.01)

(52) U.S. Cl.
  CPC ............... *C10B 53/00* (2013.01); *F26B 17/205* (2013.01); *F26B 23/022* (2013.01); *C02F 11/10* (2013.01); *C02F 2103/20* (2013.01); *C02F 2103/32* (2013.01); *F26B 2200/04* (2013.01); *F26B 2200/12* (2013.01); *F26B 2200/18* (2013.01); *Y02W 10/37* (2015.05)

(56) References Cited

FOREIGN PATENT DOCUMENTS

| | | |
|---|---|---|
| JP | 10 5799 | 1/1998 |
| JP | 3101811 | 6/2004 |
| JP | 3595201 | 12/2004 |
| JP | 2010 101543 | 5/2010 |

OTHER PUBLICATIONS

Written Opinion of the International Searching Authority issued Dec. 13, 2011, in PCT/JP2011/005025, filed Sep. 7, 2011.

International Search Report Issued Dec. 13, 2011 in PCT/JP11/05025 Filed Sep. 7, 2011.

* cited by examiner

DRYING/CARBONIZING DEVICE AND METHOD THEREOF

TECHNICAL FIELD

The present invention relates to a drying/carbonizing device and a method thereof capable of effectively heating an object to be dried such as garbage having a high-moisture content, sludge in a wastewater treatment plant, poultry manure, and food wastes such as "okara (bean curd refuse)" to efficiently dry and carbonize the object to be dried and further capable of taking out a gas that can be used as fuel.

BACKGROUND ART

As far as garbage that has been separated and crushed in a garbage separator is concerned, a conventional garbage dryer is configured to contain the garbage in a drying chamber and then agitate the garbage for drying, or configured to pass the garbage through the drying chamber for drying.

However, the garbage has a high-moisture content, so that in a case where the garbage is used as waste-derived fuel, the garbage needs to be dried sufficiently.

In order for the garbage to be subjected to drying for a long time, a large drying chamber is required, posing a problem in terms of installation space and increasing fuel consumption. This further poses an environmental problem that harmful substances contained in a fuel gas are released to atmosphere to cause pollution.

As for wastes other than the garbage, such as sludge in a wastewater treatment plant, poultry manure, and food wastes such as okara, there may be a case where drying is performed not by using the dryer but carried out in the sun or wind; however, the drying in the sun or wind is extremely inefficient.

Patent Document 1 is a garbage drier for drying the garbage that has been separated and crushed in a garbage separator.

Figure 7:
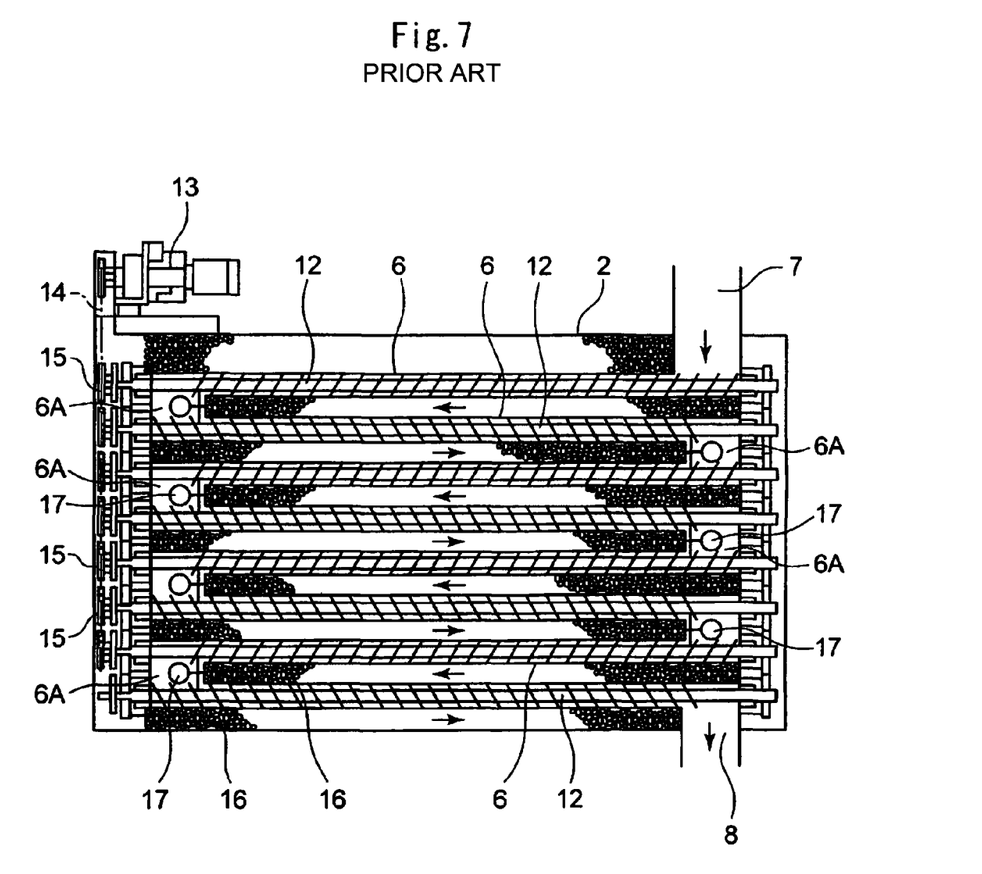
FIG. 7 is a vertically cross-sectional side view illustrating an embodiment of a conventional garbage drier.

A configuration of the garbage drier is illustrated in FIG. 7. A drying chamber 2 has a thin rectangular body, in which laterally extending tubular bodies 6 are arranged in multiple (eight, in the drawing) tiers. The tubular bodies 6 communicate with one another, in such a manner that end portions on one side and on the other side of vertically adjacent tubular bodies are connected alternately by means of connecting portions 6A, to form a single body as a whole.

The uppermost tubular body 6 is provided with a feed port 7 communicating with outside the drying chamber 2, and the lowermost tubular body 6 is provided with a discharge port 8 communicating with outside the drying chamber 2.

Although not illustrated, a pressure cylinder for pushing garbage that has been thrown from a garbage throw-in port into the tubular body 6 is provided above the feed port 7. Further, a belt conveyer for conveying the garbage is provided below the discharge port 8.

Screw conveyers 12 are incorporated in the respective tiers of the tubular bodies 6 and disposed such that forward paths and backward paths are vertically alternate. Rotation of a motor 13 is transmitted by an interlocking mechanism including a chain 14 and a sprocket 15 to cause the screw conveyers 12 to rotate in the same fashion.

Surrounding areas of the tubular bodies 6 in the drying chamber 2 are filled with granules 16 such as heat-resistant glass or ceramics.

Steam outlet ports 17 through which steam generated in the tubular bodies 6 are provided in the respective connecting portions 6A connecting the tubular bodies 6. One ends of steam delivery tubes are connected to the steam outlet ports 17, respectively, and the other ends thereof are merged together to be connected to a steam introduction tube provided at an upper portion of a primary combustion chamber.

In the configuration as described above, the garbage is pushed into the tubular bodies 6 from the feed port 7 and conveyed while being squeezed by the screw conveyers 12, with the result that moisture contained in the garbage is separated therefrom in the tubular bodies 6.

The moisture separated from the garbage is turned into steam by hot air to which the tubular bodies 6 are subjected, and the steam is fed, by a supply means, from the tubular bodies 6 to the primary combustion chamber, where the fed steam is gasified.

The garbage drier disclosed in Patent Document 1 has the configuration in which the tubular bodies through which the garbage is conveyed are arranged in multiple tiers and communicate with one another, in such a manner that end portions on one side and on the other side of vertically adjacent tubular bodies are connected alternately to form a single body as a whole. Thus, the garbage is conveyed over a long distance and, accordingly, drying time becomes long. Therefore, even in a small drying chamber, the garbage can be sufficiently subjected to drying, which eliminates the need for a large installation space.

Further, the tubular bodies are heated by indirect heat, and surrounding areas of the tubular bodies are filled with the granules, preventing thermal deformation to increase durability.

However, the moisture content of the garbage covers a wide range from several tens to about 90 percent, and the same applies to the sludge in a wastewater treatment plant, poultry manure, and food wastes such as okara. In a case of wastes having a high-moisture content, a large amount of steam is generated in the tubular bodies 6 to produce so-called "roasting condition", which extremely degrades combustion efficiency. That is, the generation of the steam in the tubular bodies 6 decreases a temperature in the tubular bodies 6, preventing the waste to be combusted from being completely carbonized.

The garbage drier disclosed in Patent Document 1 has a discharge means for discharging the steam generated in the tubular bodies 6. That is, the above-mentioned steam outlet ports 17 are provided, as the steam discharge means, in the respective connecting portions 6A connecting the tubular bodies 6. However, such discharge of steam from the connecting portions 6A is insufficient.

Thus, the generation of steam from the waste to be combusted in the tubular bodies 6 occurs over a long distance along the screw conveyers 12, preventing the generated steam from being discharged completely from the connecting portions 6A connecting to the ends of the tubular bodies 6. Application of a suction pressure or an air supply pressure for the discharge of steam causes wind flow to adversely affect a temperature rise of the tubular bodies 6.

Since the tubular bodies 6 are arranged in multiple tiers in the vertical direction and communicate with one another, in such a manner that end portions on one side and on the other side of vertically adjacent tubular bodies are connected alternately, to form a single body as a whole, the garbage is conveyed over a long distance, dried for a long time, and thus can be sufficiently subjected to drying even in a small drying chamber, which however, in turn increases fuel cost for burner combustion.

It can be considered that a suction tube for the discharge of steam is provided inside the tubular bodies 6; however, for doing so, it is necessary to increase a diameter of each of the tubular bodies 6, which in turn increases a size of the entire device.

In order to overcome such an inconvenience, Patent Document 2 tries to discharge steam generated from the waste to be dried in the tubular bodies.

Figure 8:
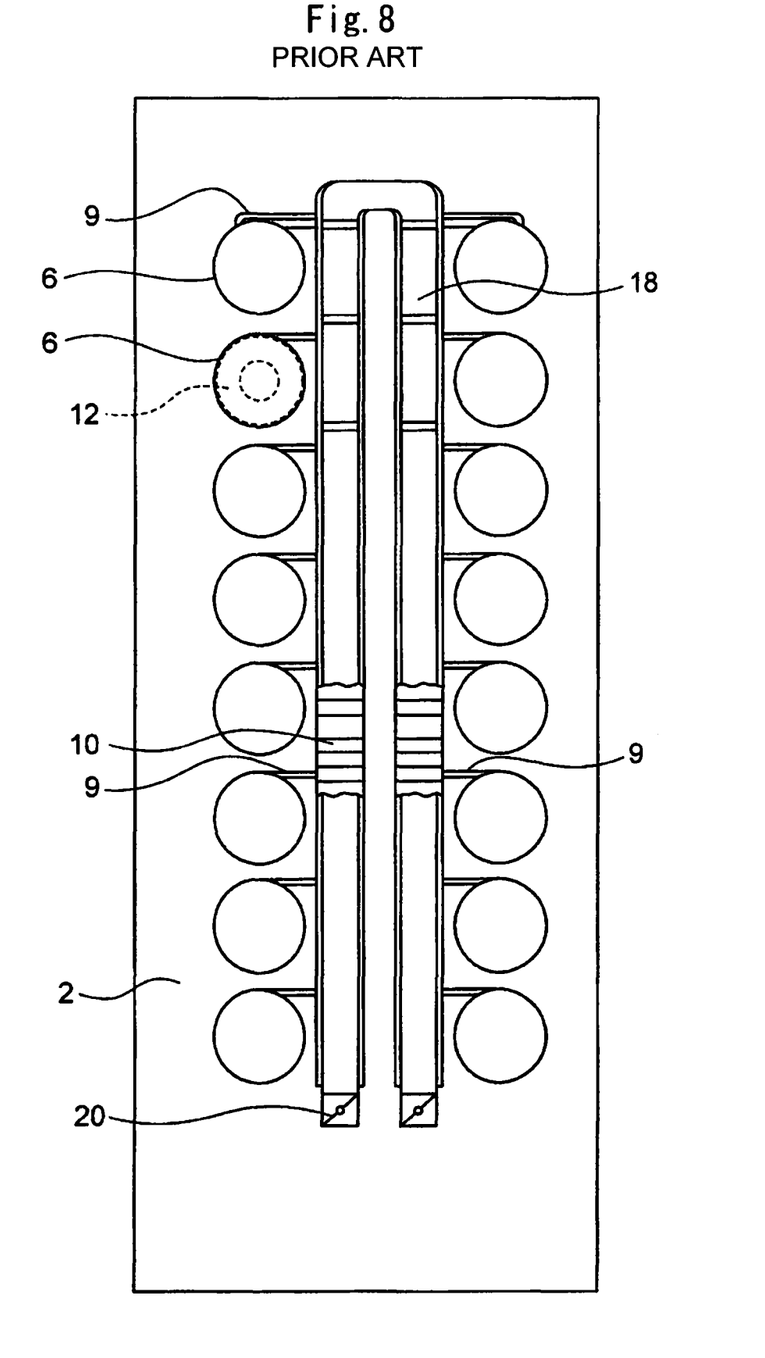
FIG. 8 is a vertically cross-sectional front view illustrating another conventional example.

A configuration of a drying/carbonizing device disclosed in Patent Document 2 is illustrated in FIG. 8. In a drying chamber 2, tubular bodies 6 each having a screw conveyor 12 therein are arranged in multiple tiers in a vertical direction so as to extend in a lateral direction. The tubular bodies 6 communicate with one another, in such a manner that end portions on one side and on the other side of vertically adjacent tubular bodies are connected alternately, to form a single body as a whole. The screw conveyers 12 are disposed such that forward paths and backward paths are vertically alternate. The tubular body 6 located at one end is provided with a feed port communicating with outside the drying chamber 2, and a tubular body 6 located at the other end is provided with a discharge port communicating with outside the drying chamber 2. In this drying/carbonizing device, exhaust branch tubes 9 are attached to an upper half of the tubular bodies 6 of the screw conveyor 12 at appropriate intervals in a length direction, and the exhaust branch tubes 9 are connected to a meandering exhaust tube 10 provided side by side with the tubular bodies 6 in its length direction.

Figure 9:
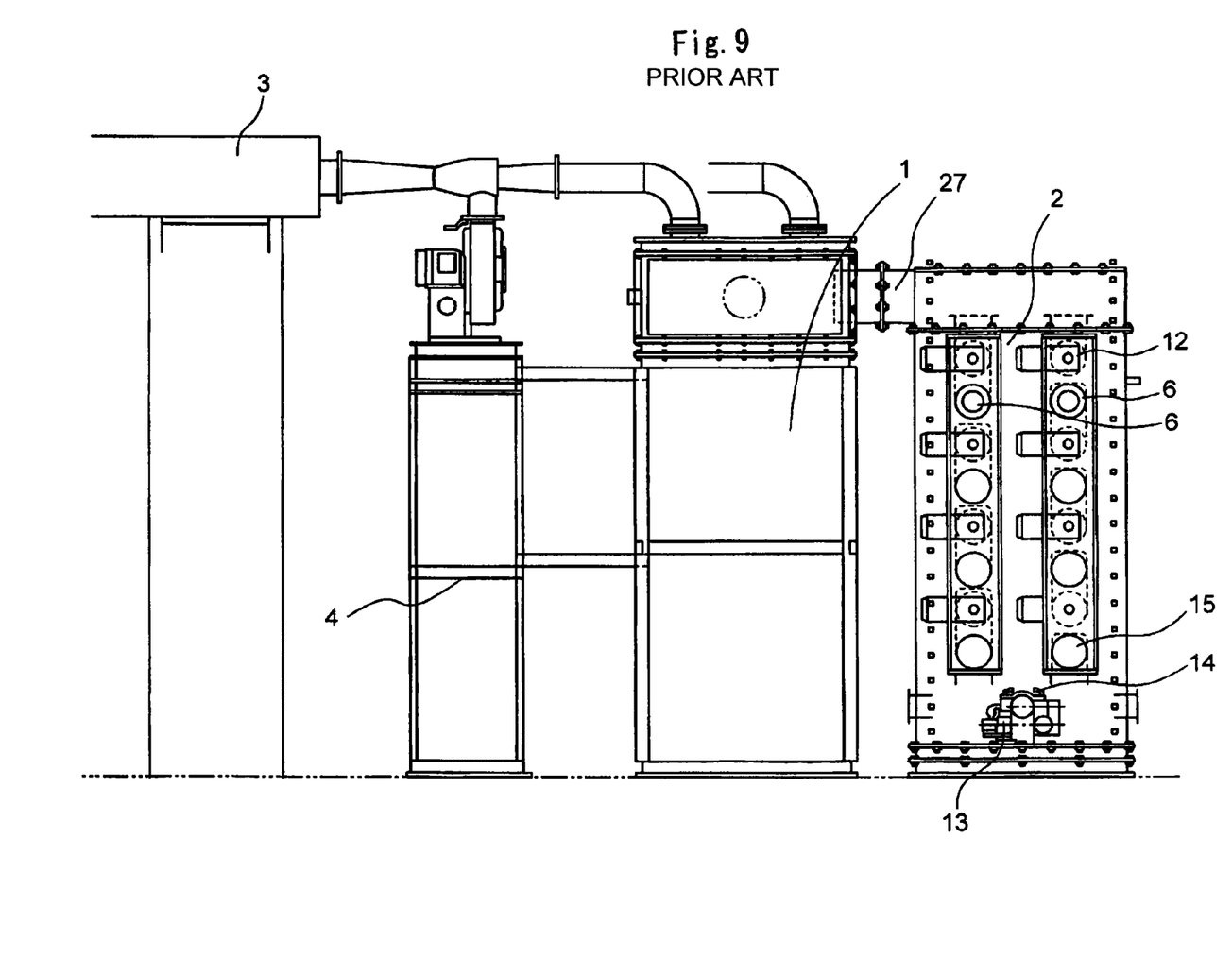
FIG. 9 is an explanatory view illustrating the entire configuration of the conventional example of FIG. 8.

As illustrated in FIG. 9, the drying chamber 2 is connected to a deodorizing chamber 1 by a two-chamber connecting duct 27 and heats combustion gas in the drying chamber 2 with a burner to decompose dioxin (800° C.). Both the drying chamber 2 and deodorizing chamber 1 are subjected to a negative pressure (blower suction), and reference numeral 3 denotes a suction blower therefor.

CITATION LIST

Patent Literature

PLT 1: Japanese Patent No. 3,595,201
PLT 2: Japanese Patent Application Laid-Open No. 2010-101543

SUMMARY OF THE INVENTION

Technical Problem

In Patent Document 2, steam generated from waste to be dried in the tubular bodies 6 can be discharged to the meandering exhaust tube 10 through the exhaust branch tubes 9 attached to the upper half of the tubular bodies 6 at appropriate intervals.

In the meandering exhaust tube 10, further gasified steam and the like eliminates the moisture of the steam, so that only gas can be taken out. The taken out gas is fed to a burner 5 or a burner connecting portion (tube) connected to the drying chamber 2 for re-combustion.

However, large air resistance is generated when the gas is introduced into the meandering exhaust tube 10, and there is a limit to an amount of gas to be introduced, restricting treatment of sludge.

Especially, not for the purpose of performing re-combustion in the device, but for the purpose of storing the taken gas in a gas tank so as to use the gas as fuel, it is necessary to draw the gas strongly. In a case of the meandering exhaust tube 10, a large installation space is required, and a distance over which the tube is laterally extended is long to increase resistance against the drawing force of the steam and gas. Therefore, strong drawing of the gas draws a temperature at the same time, while insufficient drawing force results in a failure to draw the steam and gas.

An object of the present invention is to provide a drying/carbonizing device and a method thereof capable of overcoming the inconveniences of the above-described conventional techniques, capable of smoothly treating the steam generated in tubes, and capable of efficiently drawing the gas generated together with the steam as a fuel.

Solution to Problem

In order to attain the above object, according to claim 1, there is provided a drying/carbonizing device in which tubular bodies, each incorporating a screw conveyer, are vertically arranged in multiple tiers so as to laterally extend in a drying chamber, the tubular bodies communicate with one another in such a manner that end portions on one side and on the other side of vertically adjacent tubular bodies are connected alternately to form a single body as a whole, the screw conveyers are disposed such that forward paths and backward paths are vertically alternate, a feed port is provided in one of the tubular bodies that is located at one end so as to communicate with outside the drying chamber, and a discharge port is provided in one of the tubular bodies that is located at the other end so as to communicate with outside the drying chamber, the device characterized by including: horizontal exhaust tubes attached, as lateral drawing tubes, to upper halves of the tubular bodies of the screw conveyers at an appropriate interval in a length direction of the tubular bodies; vertical drawing tubes connected to ends of the horizontal tubes; and a laterally extending lower collective tube which is connected to ends of the vertical drawing tubes and from which gas is taken out.

According to the invention of claim 1, waste to be dried is pushed into the tubular bodies from the feed port and conveyed while being squeezed by the screw conveyers. Thus, moisture contained in the waste to be dried is separated therefrom in the tubular bodies, and the waste to be dried is sufficiently subjected to drying and carbonized. The tubular bodies through which garbage is conveyed are arranged in multiple tiers and communicate with one another in such a manner that end portions on one side and on the other side of vertically adjacent tubular bodies are connected alternately to form a single body as a whole, so that the garbage is conveyed over a long distance, dried for a long time, and thus can be sufficiently subjected to drying even in a small drying chamber.

The steam/gas generated in the tubular bodies by hot air to which the tubular bodies are subjected is drawn through the lateral drawing tubes connected to the upper halves of the tubular bodies of the screw conveyers, then fed down through the vertical drawing tubes connected to the ends of the lateral drawing tubes, and can finally be taken out from the lateral lower collective tube connected to the vertical drawing tubes. Thus, the gas moves only in the horizontal and vertical directions without snaking and can be drawn out without resistance. As a result, a drawing rate of the gas/steam has been increased by 50% or more as compared to a case where a meandering exhaust tube is used.

A role of the lateral drawing tubes is to be heated in the drying chamber and eliminate moisture of the steam or gas passing therethrough and to allow only the gas to be taken out.

The lateral drawing tubes are provided in the length direction of the tubular bodies and can fully eliminate the steam generated over a long range from the waste to be dried.

In the invention according to claim 2, the horizontal exhaust tubes are each formed into a rectangular tube so as to ensure a heating surface area.

According to the invention of claim 2, the horizontal exhaust tubes are each formed into a rectangular tube so as to ensure a heating surface area, so that the horizontal exhaust tubes can be sufficiently subjected to heat from below, effectively eliminating the moisture of the steam.

In the invention according to claims 3 and 4, an upper collective tube is interposed between the horizontal exhaust tubes and vertical drawing tubes.

According to the invention of claims 3 and 4, the gas drawn through the horizontal exhaust tubes is collected in the upper collective tube and then fed down through the vertical drawing tubes, so that it is possible to evenly drawn the gas through the vertical drawing tubes while preventing the gas from being concentrated in a certain vertical drawing tube.

In the invention according to claims 5, 6, 7, and 8, two sets each including tubular bodies communicating with one another in such a manner that end portions on one side and on the other side of vertically adjacent tubular bodies are connected alternately to form a single body as a whole are arranged side by side in rows, the horizontal exhaust tubes extending from the tubular bodies arranged left and right in two rows and the vertical drawing tubes connected to the horizontal exhaust tubes are made to face each other, and the ends of the vertical drawing tubes are connected to the common lower collective tube.

According to the invention of claims 5, 6, 7, and 8, in a case where the two sets each including tubular bodies are arranged side by side in rows, the horizontal exhaust tubes extending from the tubular bodies and the vertical drawing tubes connected to the horizontal exhaust tubes are made to face each other, and the ends of the vertical drawing tubes are connected to the common lower collective tube. With this configuration, when the steam, gas, smoke or the like is drawn through these tube bodies into a dewatering chamber, convection can be equally brought about in the left and right rows of the tubular bodies, with the result that a calorie generated by burner combustion can equally be transmitted to the left and right rows, which allows drying/carbonizing to be completely made and allows the steam, gas, smoke, or the like to be smoothly drawn.

Advantageous Effects of Invention

As described above, the drying/carbonizing device according to the present invention is provided as a device capable of effectively removing steam generated from even an object to be combusted (e.g., sludge, poultry manure, or food wastes) having high viscosity or containing a large quantity of solids and carbonizing the object to be combusted. In the drying/carbonizing device in which tubular bodies, each incorporating a screw conveyer, are vertically arranged in multiple tiers so as to laterally extend in a drying chamber, the tubular bodies communicate with one another in such a manner that end portions on one side and on the other side of vertically adjacent tubular bodies are connected alternately to form a single body as a whole, the screw conveyers are disposed such that forward paths and backward paths are vertically alternate, a feed port is provided in one of the tubular bodies that is located at one end so as to communicate with outside the drying chamber, and a discharge port is provided in one of the tubular bodies that is located at the other end so as to communicate with outside the drying chamber, the steam generated in the tubular bodies can be smoothly treated, and the gas generated together with the steam can effectively be taken out as fuel and stored in a tank.

DESCRIPTION OF EMBODIMENTS

Figure 1:
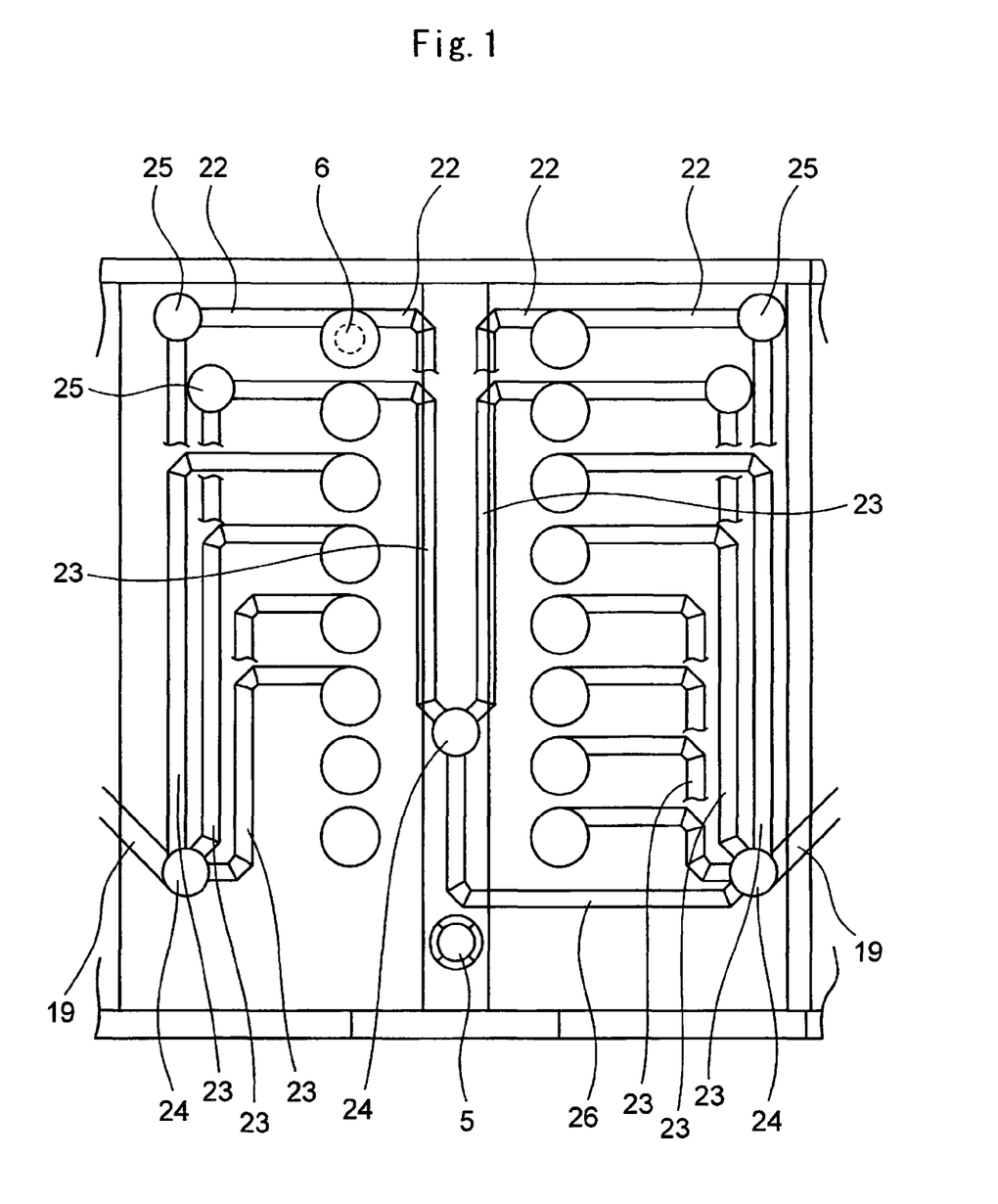
FIG. 1 is a vertically cross-sectional front view illustrating an embodiment of a drying/carbonizing device according to the present invention.
Figure 2:
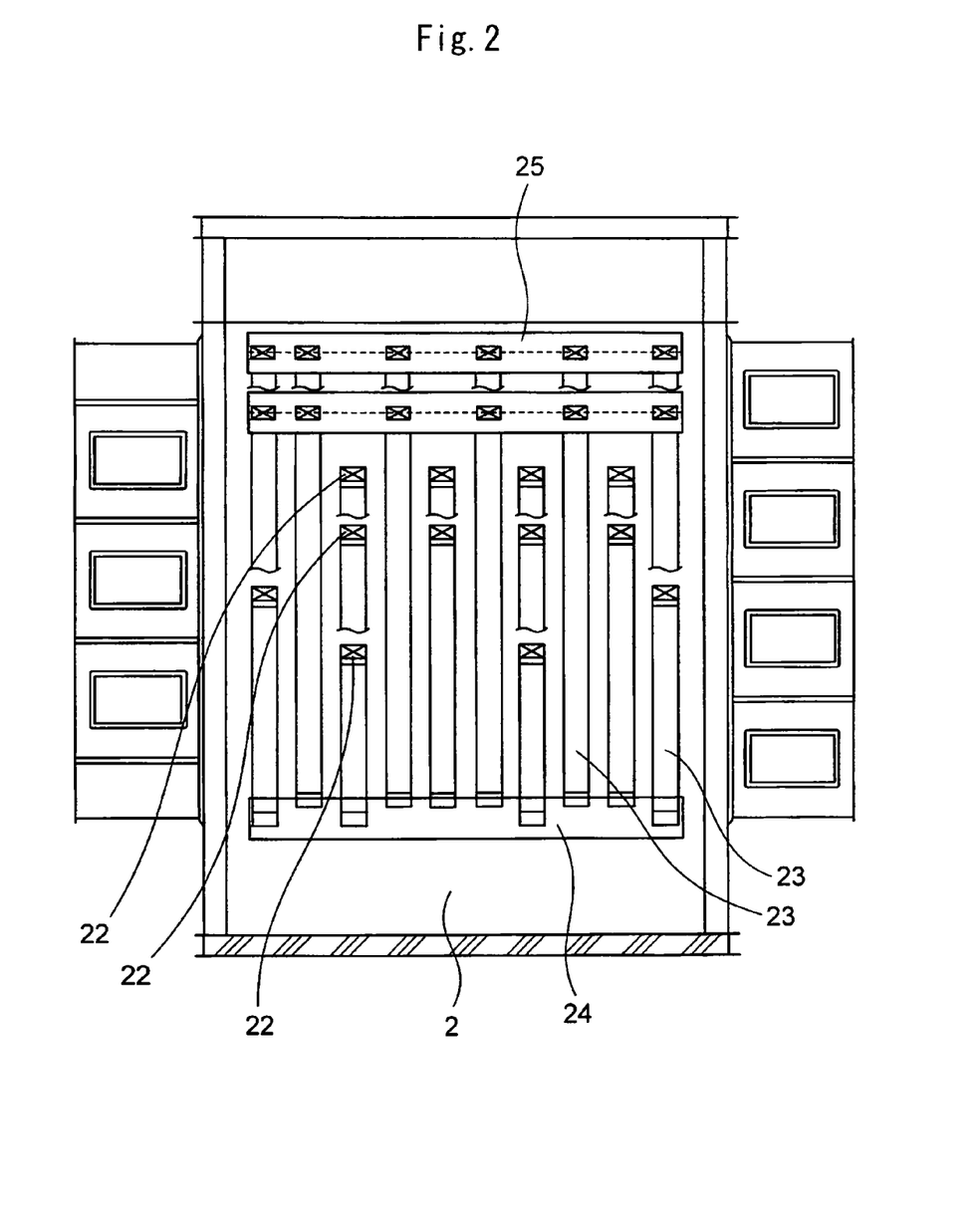
FIG. 2 is a side view illustrating the embodiment of the drying/carbonizing device according to the present invention.
Figure 3:
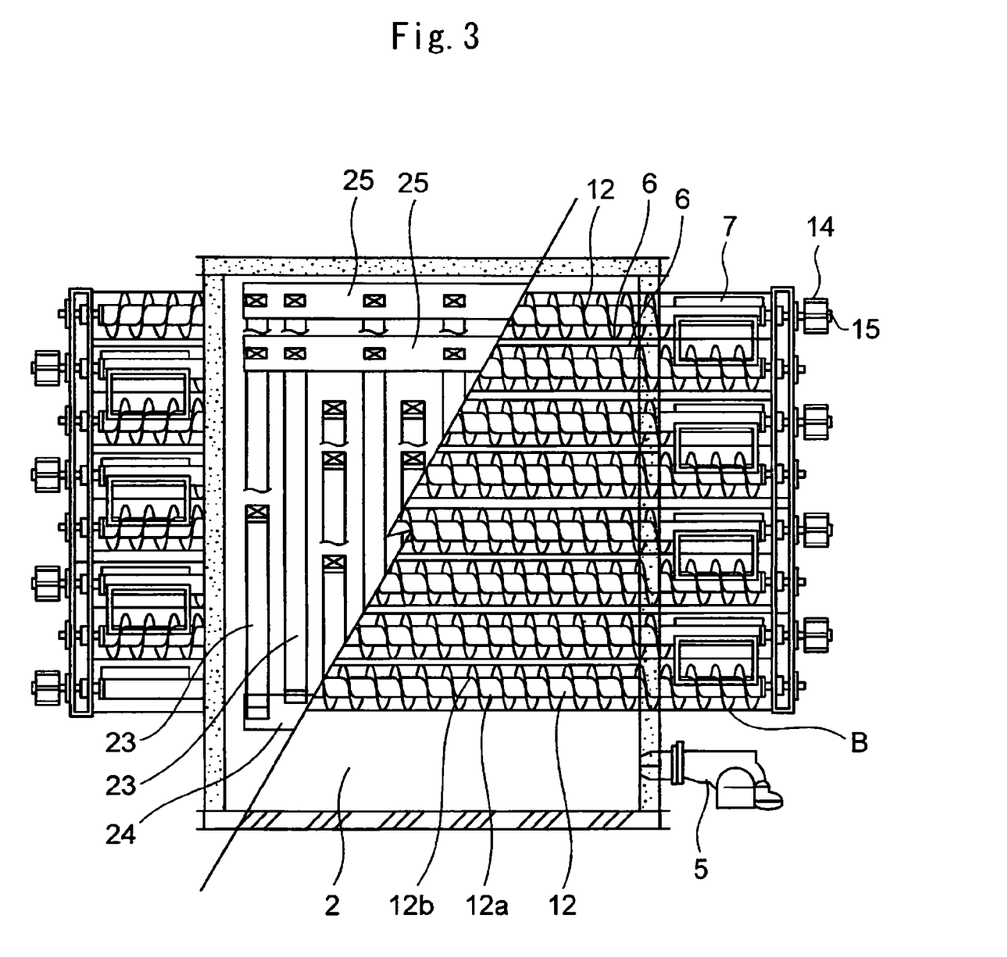
FIG. 3 is a partially cut side view illustrating the embodiment of the drying/carbonizing device according to the present invention.
Figure 4:
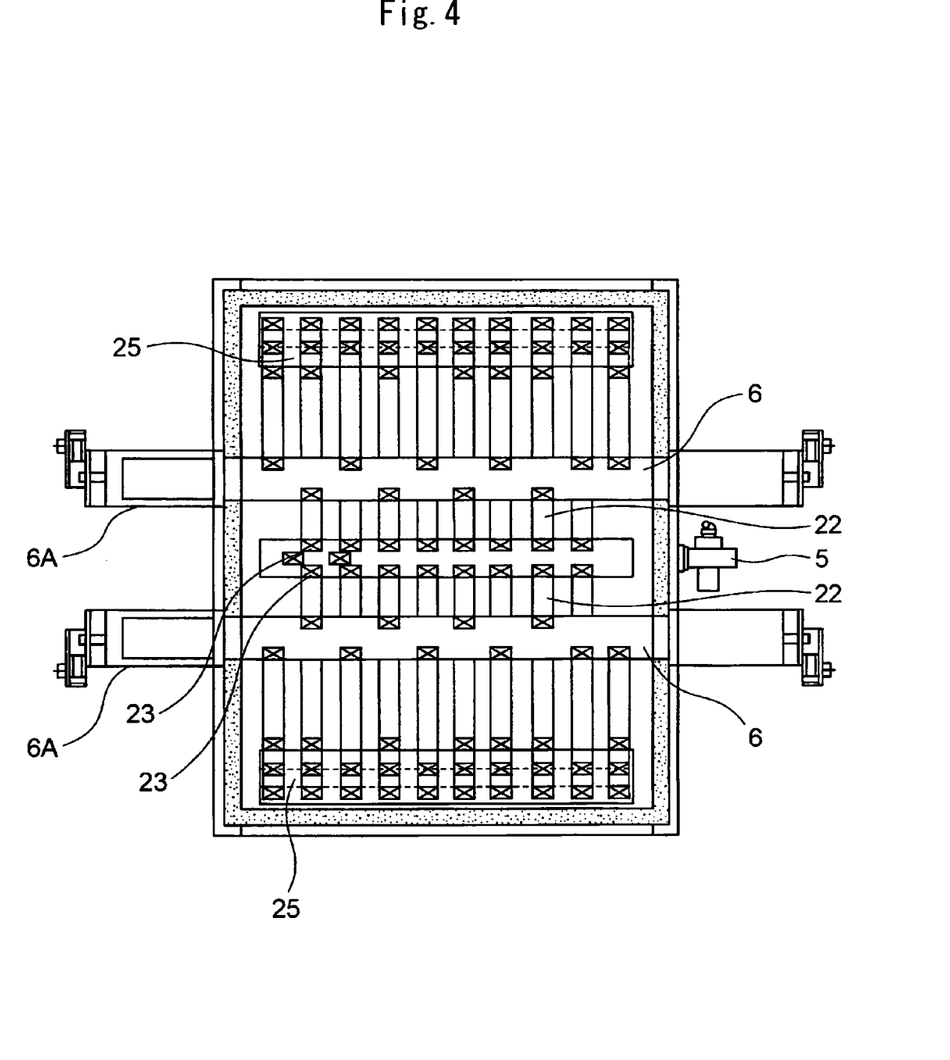
FIG. 4 is a plan view illustrating the embodiment of the drying/carbonizing device according to the present invention.
Figure 5:
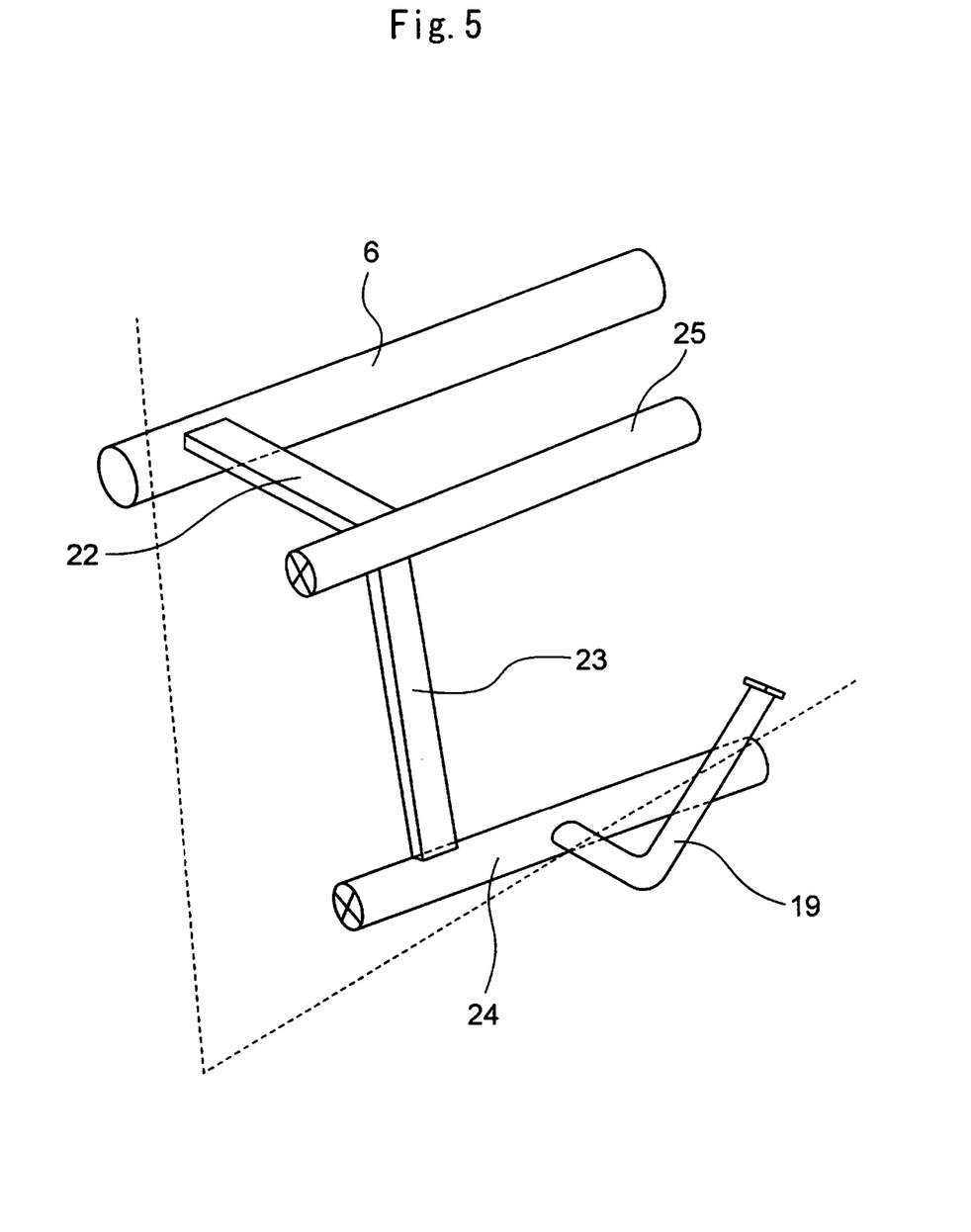
FIG. 5 is a main part schematic view for illustrating the embodiment of the drying/carbonizing device according to the present invention.

An embodiment of the present invention will be described in detail below with reference to the accompanying drawings. FIG. 1 is a vertically cross-sectional front view illustrating an embodiment of a drying/carbonizing device according to the present invention, FIG. 2 is a side view thereof, FIG. 3 is a partially cut side view thereof, FIG. 4 is a plan view thereof, and FIG. 5 is a main part schematic view thereof. Note that tubular bodies each incorporating a screw conveyer 12 are omitted in FIG. 2.

Figure 6:
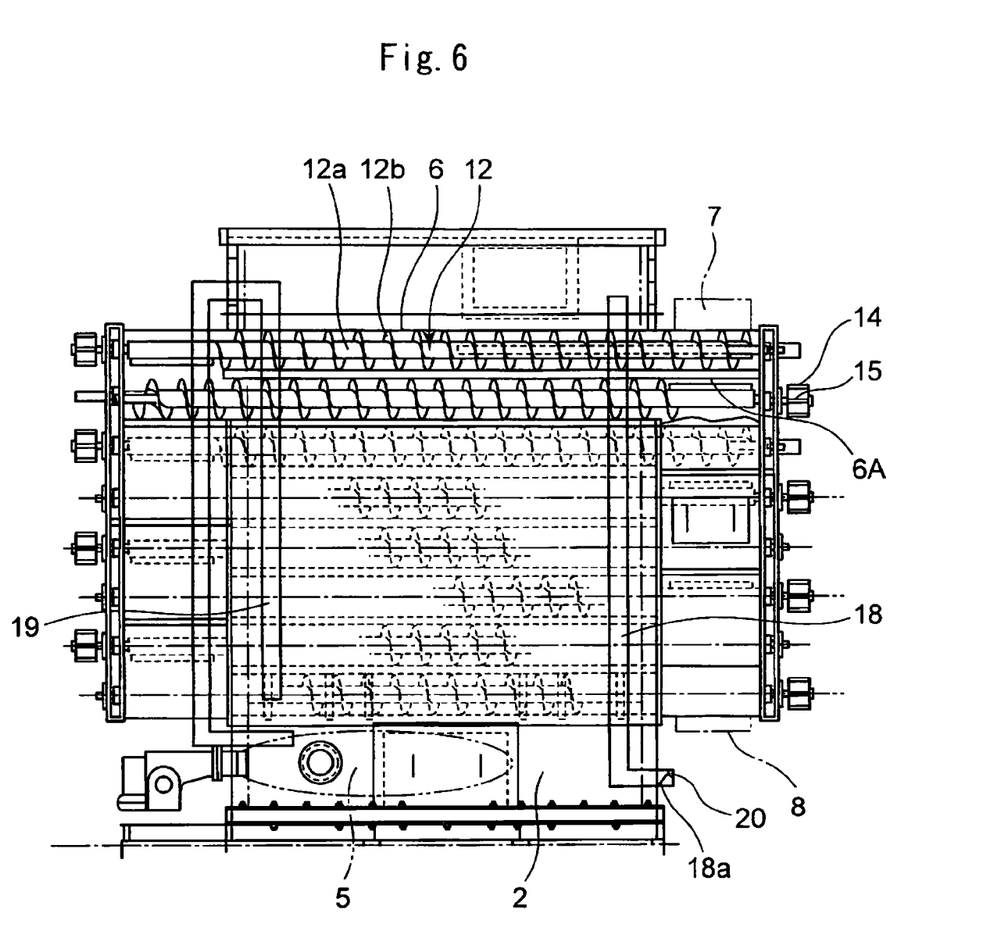
FIG. 6 is a vertically cross-sectional side view illustrating the embodiment of the drying/carbonizing device according to the present invention.

A basic configuration of the drying/carbonizing device according to the embodiment of the present invention is substantially the same as that illustrated in FIG. 7. As illustrated in FIG. 6, a drying chamber 2 is a rectangular parallelepiped chamber provided with a combustion burner (not illustrated). Inside the drying chamber 2, tubular bodies 6 are arranged in multiple (eight, in FIG. 1) tiers so as to laterally extend. The tubular bodies 6 communicate with one another, in such a manner that end portions on one side and on the other side of vertically adjacent tubular bodies are connected alternately by means of connecting portions 6A, to form a single body as a whole.

The uppermost tubular body 6 is provided with a feed port 7 communicating with outside the drying chamber 2, and the lowermost tubular body 6 is provided with a discharge port 8 communicating with outside the drying chamber 2.

Screw conveyers 12 are incorporated in the respective tiers of the tubular bodies 6 and disposed such that forward paths and backward paths are vertically alternate.

Surrounding areas of the tubular bodies 6 in the drying chamber 2 are filled with granules (see FIG. 7) such as heat-resistant glass or ceramics.

Further, in the present embodiment, two sets of vertical rows each including the eight tiers of laterally extending tubular bodies 6 are arranged left and right in the drying chamber 2.

The tubular bodies 6 of respective tiers each incorporate the screw conveyer 12. FIG. 6 denotes a screw shaft 12a, and a screw blade 12b.

In the embodiment of the present invention, as illustrated in FIG. 1, horizontal exhaust tubes 22 (as ducts) are connected, as lateral drawing tubes, to upper halves of all the eight tubular bodies 6 or upper several (six, in the drawing) tubular bodies 6. The horizontal exhaust tubes 22 are attached at an appropriate interval in the length direction of the tubular bodies 6 (six tubes 22 are attached to each tubular body 6 in the length direction thereof in the drawing).

Further, vertical drawing tubes 23 are connected to ends of the horizontal exhaust tubes 22 so as to vertically draw the internal gas. Laterally extending lower collective tubes 24 are connected to ends of the vertical drawing tubes 23, and the gas is taken out from the lower collective tubes 24.

The horizontal exhaust tubes 22 are connected to the tubular bodies 6 so as to draw the gas generated in the tubular bodies 6. In order to ensure a heating surface area, the horizontal exhaust tubes 22 are each preferably formed into a flattened rectangular tube and, correspondingly, the vertical drawing tubes 23 are each preferably formed into a rectangular tube.

The horizontal exhaust tubes 22 and vertical drawing tubes 23 may be each formed into an elliptical tube as long as they are flattened.

The lower collective tubes 24 are each a gas collecting duct whose both ends are closed, and disposed in parallel to the tubular bodies 6.

As described above, two sets of the vertical rows each including the eight tiers of laterally extending tubular bodies 6 are arranged left and right in the drying chamber 2, and the horizontal exhaust tubes 22 extend, between the left and right opposing the tubular bodies 6, from the respective tubular bodies 6 in a direction facing each other, and the vertical drawing tubes 23 are also made to face each other so as to be arranged in parallel to each other. The ends of the vertical drawing tubes 23, 23 are connected to the common lower collective tube 24. This is a main route.

Further, two cases are constructed, where the horizontal exhaust tubes 22 each extending in an opposite direction to the horizontal exhaust tubes 22 facing each other between the left and right tubular bodies 6 are provided with their end directly connected to the vertical drawing tubes 23, and the ends of the vertical drawing tubes 23 are connected to the lower collective tubes 24, and where the ends of the horizontal exhaust tubes 22 are connected to upper collective tubes 25, the vertical drawing tubes 23 are attached to the upper collective tubes 25 at an appropriate interval, and the ends of the vertical drawing tubes 23 are connected to the lower collective tubes 24. The above-mentioned lower collective tubes 24 are provided independently for each of the left and right rows of the tubular bodies 6. This is a secondary route.

The upper collective tubes 25 interposed between the horizontal exhaust tubes 22 and vertical drawing tubes 23 are each also a gas collecting duct whose both ends are closed, and disposed in parallel to the tubular bodies 6.

The common lower collective tube 24 among the left and right rows of the tubular bodies 6 and the lower collective tubes 24 provided independently for each of the left and right rows of the tubular bodies 6 are connected to one another by connecting tubes 26. The generated gas is fed from the common lower collective tube 24 to the independent lower collective tubes 24 to which drawing tubes 19 are connected.

The drawing tubes 19 are each led outside the drying chamber 2. An intermediate fan (not illustrated) is provided at the led-out portion, and an end of the led-out portion is connected to a gas fuel storage tank (not illustrated), etc. The reason why the intermediate fan is provided at the led-out portion is to prevent the drawing tubes 19 from being subjected directly to heat in the drying chamber 2. A blower may be used in place of the intermediate fan.

Alternatively, a configuration may be adopted in which the drawing tubes 19 is once led outside the drying chamber 2, the intermediate fan is provided at the led-out portion, and an exhaust port end of each of the drawing tubes 19 is opened in the drying chamber 2.

The taken out gas is fed to a burner 5 or a burner connecting portion (tube) connected to the drying chamber 2 for re-combustion.

In the configuration as described above, waste to be dried such as garbage or sludge is pushed into the tubular bodies 6 from the feed port 7, conveyed by the screw conveyers 12, and heated (to about 650° C.) in the drying chamber 2.

Next, usage and operation will be described. The drying chamber 2 can be used alone for taking out the gas.

The waste to be dried is pushed into the tubular bodies 6 from the feed port 7 and conveyed while being squeezed by the screw conveyers 12, with the result that moisture and gas contained in the waste to be dried are separated therefrom as stream in the tubular bodies 6.

Since the tubular bodies 6 are arranged in multiple tiers in the vertical direction and communicate with one another in such a manner that end portions on one side and on the other side of vertically adjacent tubular bodies are connected alternately to form a single body as a whole, the waste to be dried is conveyed over a long distance, dried for a long time, and thus can be sufficiently subjected to drying even in a small drying chamber.

Then, the separated moisture and gas are gasified into steam by hot air to which the tubular bodies 6 are subjected, and the steam is fed down from the horizontal exhaust tubes 22 to vertical drawing tubes 23.

In the horizontal exhaust tubes 22, the gasified steam and the like eliminates the moisture of the steam, so that only gas can be taken out. The taken out gas is fed down to the lower collective tubes 24 and taken out as fuel therefrom.

REFERENCE SIGN LIST

1: Deodorizing chamber
2: Drying chamber
3: Suction blower
5: Burner
6: Tubular body
6A: connecting portion
7: Feed port
8: Discharge port
9: Exhaust branch tube
10: Meandering exhaust tube
12: Screw conveyer
12a: Screw shaft
12b: Screw blade
13: Motor
14: Chain
15: Sprocket
16: Granule
17: Steam outlet port
18: Air-supply tube
19: Drawing tube
19a: Led-out portion
20: Manual damper
21: Intermediate fan
22: Horizontal exhaust tube 23: Vertical drawing tube
24: Lower collective tube
25: Upper collective tube
26: Connecting tube
27: Two-chamber connecting duct

What is claimed is:

1. A drying/carbonizing device in which tubular bodies, each incorporating a screw conveyer, are vertically arranged in multiple tiers so as to laterally extend in a drying chamber, the tubular bodies communicate with one another in such a manner that end portions on one side and on the other side of vertically adjacent tubular bodies are connected alternately to form a single body as a whole, the screw conveyers are disposed such that forward paths and backward paths are vertically alternate, a feed port is provided in one of the tubular bodies that is located at one end so as to communicate with outside the drying chamber, and a discharge port is provided in one of the tubular bodies that is located at the other end so as to communicate with outside the drying chamber, the device comprising:
   horizontal exhaust tubes attached, as lateral drawing tubes, to upper halves of the tubular bodies of the screw conveyers at an appropriate interval in a length direction of the tubular bodies;
   vertical drawing tubes connected to ends of the horizontal exhaust tubes; and
   a laterally extending lower collective tube which is connected to ends of the vertical drawing tubes and from which gas is taken out as fuel.

2. The drying/carbonizing device according to claim 1, wherein
   the horizontal exhaust tubes are each formed into a rectangular tube so as to ensure a heating surface area.

3. The drying/carbonizing device according to claim 1, further comprising
   an upper collective tube is interposed between the horizontal exhaust tubes and vertical drawing tubes.

4. The drying/carbonizing device according to claim 2, further comprising
   an upper collective tube is interposed between the horizontal exhaust tubes and vertical drawing tubes.

5. The drying/carbonizing device according to claim 1, comprising
   two sets each including tubular bodies communicating with one another, in such a manner that end portions on one side and on the other side of vertically adjacent tubular bodies are connected alternately, to form a single body as a whole are arranged side by side in rows,
   the horizontal exhaust tubes extending from the tubular bodies arranged in two rows and the vertical drawing tubes connected to the horizontal exhaust tubes are made to face each other, and
   the ends of the vertical drawing tubes are connected to the common lower collective tube.

6. The drying/carbonizing device according to claim 2, comprising
   two sets each including tubular bodies communicating with one another, in such a manner that end portions on one side and on the other side of vertically adjacent tubular bodies are connected alternately, to form a single body as a whole are arranged side by side in rows,
   the horizontal exhaust tubes extending from the tubular bodies arranged in two rows and the vertical drawing tubes connected to the horizontal exhaust tubes are made to face each other, and
   the ends of the vertical drawing tubes are connected to the common lower collective tube.

7. The drying/carbonizing device according to claim 3, comprising
   two sets each including tubular bodies communicating with one another, in such a manner that end portions on one side and on the other side of vertically adjacent tubular bodies are connected alternately, to form a single body as a whole are arranged side by side in rows,
   the horizontal exhaust tubes extending from the tubular bodies arranged in two rows and the vertical drawing tubes connected to the horizontal exhaust tubes are made to face each other, and
   the ends of the vertical drawing tubes are connected to the common lower collective tube.

8. The drying/carbonizing device according to claim 4, comprising
   two sets each including tubular bodies communicating with one another, in such a manner that end portions on one side and on the other side of vertically adjacent tubular bodies are connected alternately, to form a single body as a whole are arranged side by side in rows,
   the horizontal exhaust tubes extending from the tubular bodies arranged in two rows and the vertical drawing tubes connected to the horizontal exhaust tubes are made to face each other, and
   the ends of the vertical drawing tubes are connected to the common lower collective tube.

9. A drying/carbonizing device comprising in a drying chamber:
   tubular bodies communicating with one another, in such a manner that end portions on one side and on the other side of vertically adjacent tubular bodies are connected alternately, to form a single body as a whole and respectively including rotatable screw conveyers disposed such that forward paths and backward paths are vertically alternate;
   a feed port provided in one of the tubular bodies that is located at one end;
   a discharge port provided in one of the tubular bodies that is located at the other end;
   lateral drawing tubes which are horizontal exhaust tubes attached and connected to the tubular bodies at an appropriate interval in a length direction of the tubular bodies;
   vertical drawing tubes connected to ends of the lateral drawing tubes so as to vertically extend; and
   a lower collective tube which is connected to ends of the vertical drawing tubes and extend laterally at a portion below the tubular bodies and from which gas is taken out.

10. The drying/carbonizing device according to claim 9, wherein
    the horizontal exhaust tubes are each formed into a rectangular tube.

11. The drying/carbonizing device according to claim 10, further comprising
    an upper collective tube is interposed between the horizontal exhaust tubes and vertical drawing tubes.

12. The drying/carbonizing device according to claim 9, comprising
    two sets each including tubular bodies communicating with one another, in such a manner that end portions on one side and on the other side of vertically adjacent tubular bodies are connected alternately, to form a single body as a whole are arranged side by side in rows,
    the horizontal exhaust tubes connected to the tubular bodies arranged left and right in two rows and the vertical drawing tubes connected to the horizontal exhaust tubes are made to face each other, and the ends of the vertical drawing tubes are connected to the common lower collective tube.

13. The drying/carbonizing device according to claim 10, comprising two sets each including tubular bodies communicating with one another, in such a manner that end portions on one side and on the other side of vertically adjacent tubular bodies are connected alternately, to form a single body as a whole are arranged side by side in rows, the horizontal exhaust tubes connected to the tubular bodies arranged left and right in two rows and the vertical drawing tubes connected to the horizontal exhaust tubes are made to face each other, and the ends of the vertical drawing tubes are connected to the common lower collective tube.

14. The drying/carbonizing device according to claim 11, comprising two sets each including tubular bodies communicating with one another, in such a manner that end portions on one side and on the other side of vertically adjacent tubular bodies are connected alternately, to form a single body as a whole are arranged side by side in rows, the horizontal exhaust tubes connected to the tubular bodies arranged left and right in two rows and the vertical drawing tubes connected to the horizontal exhaust tubes are made to face each other, and the ends of the vertical drawing tubes are connected to the common lower collective tube.

15. A drying/carbonizing method characterized by comprising:

making an object to be combusted thrown in from a feed port pass through tubular bodies, one of which that is located at one end is provided with the feed port and one of which that is located at the other end is provided with a discharge port, toward the discharge port by rotatable screw conveyers incorporated respectively in the tubular bodies;

drawing gas generated in the tubular bodies through lateral drawing tubes which are horizontal exhaust tubes connected to the tubular bodies;

drawing the gas through vertical drawing tubes connected to ends of the lateral drawing tubes so as to vertically extend; and collecting the gas drawn through the vertical drawing tubes in a lower collective tube connected to ends of the vertical drawing tubes and extending laterally at a portion below the tubular bodies, and taking out the collected gas from the lower collective tube.

16. The drying/carbonizing method according to claim 15, wherein the horizontal exhaust tubes are each formed into a rectangular tube.

17. The drying/carbonizing method according to claim 16, wherein an upper collective tube is interposed between the horizontal exhaust tubes and the vertical drawing tubes.

* * * * *